United States Patent
Englmeier

(10) Patent No.: US 12,281,854 B2
(45) Date of Patent: Apr. 22, 2025

(54) METHOD FOR PRODUCING A WOVEN HEAT EXCHANGER

(71) Applicant: Dr. Ing. h.c. F. Porsche Aktiengesellschaft, Stuttgart (DE)

(72) Inventor: Michael Englmeier, Lenting (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 0 days.

(21) Appl. No.: 18/472,242

(22) Filed: Sep. 22, 2023

(65) Prior Publication Data
US 2024/0118033 A1 Apr. 11, 2024

(30) Foreign Application Priority Data
Oct. 5, 2022 (DE) .................. 10 2022 125 627.8

(51) Int. Cl.
*F28D 7/08* (2006.01)
*B23P 15/26* (2006.01)

(52) U.S. Cl.
CPC ............. *F28D 7/08* (2013.01); *B23P 15/26* (2013.01)

(58) Field of Classification Search
CPC . F28D 7/08; B23P 15/26; F28F 21/062; F28F 21/08; B21D 53/06
USPC ....................................................... 165/172
See application file for complete search history.

(56) References Cited

U.S. PATENT DOCUMENTS

| | | | | |
|---|---|---|---|---|
| 2,977,265 | A * | 3/1961 | Forsberg | B28B 1/265 165/905 |
| 3,536,611 | A * | 10/1970 | De Filippi | B01D 63/033 210/321.89 |
| 4,140,637 | A * | 2/1979 | Walter | B01D 63/0233 210/321.79 |
| 4,172,794 | A * | 10/1979 | Sigdell | B01D 63/0221 210/321.89 |
| H263 | H * | 5/1987 | Piscitella | 165/172 |
| 5,297,591 | A * | 3/1994 | Baurmeister | D03D 15/37 139/420 A |
| 8,580,184 | B2 * | 11/2013 | Montoya | B01D 63/0232 264/607 |
| 8,622,950 | B2 * | 1/2014 | Lauber | F28D 7/163 29/890.033 |
| 11,135,688 | B2 * | 10/2021 | Englmeier | F28D 7/16 |
| 11,480,398 | B2 * | 10/2022 | Hemker | F28F 9/02 |

(Continued)

FOREIGN PATENT DOCUMENTS

DE 102020105454 A1 9/2021

*Primary Examiner* — Jon T. Schermerhorn, Jr.
(74) *Attorney, Agent, or Firm* — LEYDIG, VOIT & MAYER, LTD.

(57) ABSTRACT

A method for producing a woven heat exchanger, includes providing a plurality of microchannel tubes for insertion into a weaving apparatus and weaving the plurality of microchannel tubes within a central region of the heat exchanger by the weaving apparatus. The method further includes merging the plurality of woven microchannel tubes within a first and second end region arranged on the central region for producing a first and second end portion having a circular cross-section. The method further includes gluing the plurality of woven and merged microchannel tubes within the first and second end region and shortening the plurality of weaved, merged, and glued microchannel tubes within the first and second end region.

17 Claims, 3 Drawing Sheets

(56) References Cited

U.S. PATENT DOCUMENTS

| | | | |
|---|---|---|---|
| 11,519,670 B2 * | 12/2022 | Fausett | .............. F28D 1/05316 |
| 2020/0238450 A1 | 7/2020 | Englmeier | |
| 2024/0210125 A1 * | 6/2024 | Giuliano | .................. F28F 7/02 |

* cited by examiner

METHOD FOR PRODUCING A WOVEN HEAT EXCHANGER

CROSS REFERENCE TO RELATED APPLICATIONS

This application claims benefit to German Patent Application No. DE 10 2022 125 627.8, filed on Oct. 5, 2022, which is hereby incorporated by reference herein.

FIELD

The present invention relates to a method for producing a woven heat exchanger, a woven heat exchanger, and a motor vehicle having such a woven heat exchanger.

BACKGROUND

The use of heat exchangers in motor vehicles is known in the prior art. Common heat exchangers generally comprise a plurality of tubular microchannels, which are interwoven with one another and, during operation, are perfused by a medium, such as warm combustion air or cold cooling air, and by a cooling medium, in particular a cooling fluid, such that a heat exchange between the warm or cold air and the cooling medium can occur and the combustion air can be cooled off by the cooling fluid or the cooling fluid can be cooled off by the cold air.

To introduce and discharge the cooling fluid, the tubular microchannels are often fluid-tightly sealed to tanks at their end sides, via which the cooling fluid is introduced and discharged into the microchannels. For reasons of stability, glue frames and/or intermediate plates are arranged between the tanks and the microchannels, which have a plurality of recesses for connection to the apertures of the microchannels. The tubular microchannels are inserted into the recesses formed in the intermediate plates or the glue frame during the production of the heat exchanger and connected to the intermediate plates or the glue frame by soldering or gluing. Disadvantageously, the insertion or threading of the tubular microchannels into the holes of the glue frame or the intermediate plates occurs entirely manually, which is not only extremely time-consuming but also prone to errors.

SUMMARY

In an embodiment, the present disclosure provides a method for producing a woven heat exchanger, comprising providing a plurality of microchannel tubes for insertion into a weaving apparatus and weaving the plurality of microchannel tubes within a central region of the heat exchanger by the weaving apparatus. The method further comprises merging the plurality of woven microchannel tubes within a first and second end region arranged on the central region for producing a first and second end portion having a circular cross-section. The method further comprises gluing the plurality of woven and merged microchannel tubes within the first and second end region and shortening the plurality of weaved, merged, and glued microchannel tubes within the first and second end region.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
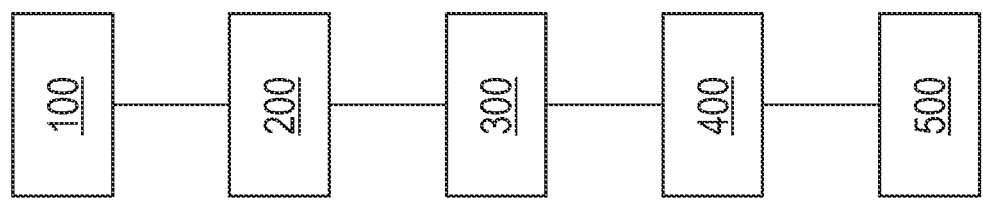
FIG. 1 illustrates the individual steps of a method according to an embodiment of the invention for producing a woven heat exchanger.

In an embodiment, the present invention at least partially remedies the disadvantages described above, and provides a method for producing a woven heat exchanger that enables the generation of stable and effective heat exchangers for arrangement in a motor vehicle in a simple, fast, and cost-effective manner.

Further features and details arise from the description, and the drawings. Technical features that are disclosed regarding the method according to embodiments of the invention also apply in connection with the woven heat exchanger and motor vehicle according to embodiments of the invention, and vice versa, so that reference is or can always be mutually made with respect to the disclosure regarding the individual aspects of the invention.

According to an embodiment of the present invention, there is provided a method for producing a woven heat exchanger. The method according to an embodiment of the present invention comprises the steps of providing a plurality of microchannel tubes for insertion into a weaving apparatus; weaving the plurality of microchannel tubes within a central region of the heat exchanger by means of the weaving apparatus; merging the plurality of woven microchannel tubes within a first and second end region arranged on the central region for producing a first and second end portion having a circular cross-section. Moreover, the method according to an embodiment of the present invention comprises the steps of gluing the plurality of woven and merged microchannel tubes within the first and second end region and shortening the plurality of weaved, merged, and glued microchannel tubes within the first and second end region.

According to an embodiment of the present invention, a method for producing a woven heat exchanger is provided, which, through the combination of a plurality of interwoven microchannel tubes within a first and second end region for the production of a first and second end portion having a circular cross-section as well as a final gluing and shortening of the microchannel tubes, enables the generation of a consistent and effective heat exchanger for assembly in a motor vehicle in a simple, quick, and cost-effective manner.

Compared to known methods for producing a woven heat exchanger, the method according to an embodiment of the invention is characterized in particular by the combination of the plurality of woven microchannel tubes within a first and second end region arranged on a central region for the production of a first and second end portion having a circular cross-section. In this case, microchannel tubes that are "extended" in a targeted manner are preferably used, whose end sides project beyond the central region on two opposite sides and are merged in the projecting regions. The regions of the heat exchanger which extend beyond the central region therefore have a dual function, namely the function of enabling a simple and compact arrangement as well as the function of cooling. In this way, it is possible to omit tanks arranged on the end sides for the introduction and removal of cooling fluid and/or glue frames and/or intermediate plates and thus not only save weight and costs, but also increase the stability or component life. With the merged regions extending beyond the central region of the heat exchanger, a comparatively larger cooling surface can also be generated, so that the heat exchanger described here preferably constitutes a fully cooled component in which all components are actively cooled and perfused.

The interwoven heat exchanger that can be produced via an embodiment of the present method can preferably be used in a car or truck. However, the use in other vehicles, such as commercial vehicles, ships, or airplanes, is likewise provided for.

In the context of an embodiment of the invention, a microchannel tube can preferably be understood to be an elongated, in particular cylindrical, hollow body having a constant diameter of 0.01 to 10 mm, in particular 0.1 to 1 mm. A weaving apparatus can in particular be understood as a component or apparatus (e.g. a weaving frame) with the aid of which a weaving operation can be performed, preferably being at least partially automated. A merging of the plurality of interwoven microchannel tubes can be understood within the scope of an embodiment of the invention, in particular, as a process such as interweaving or rotating the ends of the microchannel tubes, with which a compressed structure having a preferably reduced circular cross-section can be generated. It should be understood that a circular cross-section can preferably also be understood as cross-sectional structures that deviate slightly from an ideal circular cross-section, e.g. sometimes formed in an oval or elliptical manner. The provision of a plurality of microchannel tubes described here can preferably be carried out by arranging the microchannel tubes side-by-side and/or on top of one another in a weaving apparatus. Preferably, the woven heat exchanger is weaved only within the central region. By contrast, in the end regions adjacent to the central region, the microchannel tubes can remain preferably unwoven and merely merged.

In the context of a stable woven structure that can be easily and quickly produced, according to an embodiment of the invention, it can advantageously be provided that the weaving of the plurality of microchannel tubes within the central region of the heat exchanger as provided according to an embodiment of the invention can be carried out by means of wires, wherein, during the weaving, the plurality of microchannel tubes are preferably entwined at least partially by the wires, in particular on two sides. In particular, warp wires can be used as the wires, which have a thickness of at least 50 µm. Also, the use of weft wires is contemplated. The woven structure arranged within the central region as described here is advantageously suitable or provided for ensuring a high mechanical stability.

In the context of a stable structure that can be easily and quickly produced, in particular in the end regions, it can be advantageously provided according to an embodiment of the invention that the merging of the plurality of woven microchannel tubes within the first and second end region takes place in the form of an interweaving of the microchannel tubes, wherein the plurality of woven microchannel tubes are preferably interwoven into a first and second end portion arranged centrally within the first and second end region, having a circular cross-section. The end portions produced in this manner can in particular be placed on tubes or connections via which cooling fluids are introduced into and discharged out of the microchannel tubes.

In the context of a simple, fast, and cost-effective production, it can be advantageously provided according to an embodiment of the invention that the plurality of microchannel tubes are provided for insertion into a weaving apparatus at a length that extends beyond the central region, wherein the microchannel tubes are preferably merged at the regions extending beyond the central region in order to produce a first and second end portion having a circular cross-section, wherein a first and second frame arranged on the end sides of the central region are used in particular in order to support a merging of the microchannel tubes. Providing the microchannel tubes at an overlength will in particular allow for better fixation of the microchannel tubes upon merging. The regions projecting beyond the central region are preferably arranged entirely within the end regions and/or form the end regions described here. The frame for assisting in the assembly of the microchannel tubes can be configured, for example, in the form of a glue frame or the like which is limiting on the terminal side, and can comprise, for example, recesses for the passage of the microchannel tubes.

In order to generate compactly designed end portions a fast, simple, and reliable manner, it can be advantageously provided according to an embodiment of the invention that the gluing of the plurality of woven and merged microchannel tubes within the first and second end region takes place via an immersion process, wherein the woven and merged microchannel tubes are preferably immersed on their end sides in a glue bath, in particular an epoxy glue bath. By means of an immersion process as described here, the microchannel tubes can also be connected to one another particularly quickly, easily, and reliably. With regard to an effective cooling, it can further be preferably provided that the microchannel tubes are purged with compressed air immediately after gluing in order to prevent the inputs and outputs of the microchannel tubes from being glued. It is also contemplated that instead of purging, the inputs and outputs are masked in order to prevent the inputs and outputs from becoming glued.

In the context of a simple, fast, and accurate machining in order to ensure uniform end portions, it can further be advantageous when the shortening of the plurality of woven, merged, and glued microchannel tubes is accomplished via cutting, sawing, or milling.

In the present case, it will also be appreciated that individual, several, or all mandatory and/or optional steps of the method according to an embodiment of the invention can be carried out in the described sequence, but also in deviation from the described sequence. In this case, individual, several, or all mandatory and/or optional steps of the method according to an embodiment of the invention can in particular be repeated, e.g. repeated cyclically.

It will further be appreciated that individual, multiple, or all of the mandatory and optional steps of the method according to an embodiment of the invention can also be implemented by a computer.

A further subject-matter of an embodiment of the invention is a woven heat exchanger having a plurality of microchannel tubes for use in a motor vehicle, preferably produced via a method as described above. The woven heat exchanger according to an embodiment of the invention comprises a central region in which the plurality of microchannel tubes are given in a woven state and a first and second end region arranged on the central region, in which the plurality of microchannel tubes are merged and glued together in order to form a first and second end portion having a circular cross-section. Thus, the woven heat exchanger according to an embodiment of the invention has the same advantages as have been described in detail with respect to the method described above. The first and second end portions having a circular cross-section can preferably be arranged on a terminating tube for the introduction of a cooling fluid, wherein water, an oil water mixture, an organic coolant, or a water-based dielectric can preferably be used as the cooling fluid.

With regard to a durable, stable, and versatile design, it can advantageously be provided according to an embodiment of the invention that the microchannel tubes consist of a plastic, preferably from one of the following plastics: polyetherether ketone, polyether ketone polyimide, polyoxymethylene, polyethylene terephthalate. In particular, the aforementioned plastics have a high strength, temperature-resistance, and chemical resistance.

In order to guarantee a sufficiently compact, stable, and solid structure, it can advantageously further be provided that the length of the central region is at least 3 times, preferably at least 5 times, in particular at least 10 times the length of the first and/or second end region.

In order to ensure a sufficiently compact, stable, and solid structure and a simultaneously fast and simple merging for the generation of compact end portions, it can be particularly advantageous when the microchannel tubes are aligned parallel to one another within the central region and at an angle to one another within the end regions, preferably extending towards one another at an angle.

A further subject-matter of an embodiment of the invention is a motor vehicle comprising a woven heat exchanger as described above. Thus, the motor vehicle according to an embodiment of the invention has the same advantages as have been described in detail with respect to the aforementioned method or the aforementioned woven heat exchanger.

Further advantages, features, and details of embodiments of the invention arise from the following description, in which exemplary embodiments of the invention are described in detail with reference to the drawings. The features mentioned in the description can be essential for embodiments of the invention individually or in any combination.

FIG. 1 shows the individual steps of a method according to an embodiment of the invention for producing a woven heat exchanger 2.

As can be seen from FIG. 1, the method according to an embodiment of the present invention comprises the steps of providing 100 a plurality of microchannel tubes 4 for insertion into a weaving apparatus; weaving 200 the plurality of microchannel tubes 4 within a central region 6 of the heat exchanger 2 by means of the weaving apparatus; merging 300 the plurality of woven microchannel tubes 4 within a first and second end region 8a, 8b arranged on the central region 6 for producing a first and second end portion 10a, 10b having a circular cross-section. Moreover, the method according to an embodiment of the present invention comprises the steps of gluing 400 the plurality of woven and merged microchannel tubes 4 within the first and second end region 8a, 8b and shortening 500 the plurality of weaved, merged, and glued microchannel tubes 4 within the first and second end region 8a, 8b.

The weaving 200 of the plurality of microchannel tubes 4 within the central region 6 of the heat exchanger 2 as provided according to an embodiment of the invention can be carried out by means of wires, wherein, during the weaving 200, the plurality of microchannel tubes 4 can be preferably entwined at least partially by the wires, in particular on two sides.

Additionally, the merging 300 of the plurality of woven microchannel tubes 4 within the first and second end region 8a, 8b as provided according to an embodiment of the invention can advantageously take place in the form of an interweaving of the microchannel tubes 4, wherein the plurality of woven microchannel tubes 4 can be preferably interwoven into a first and second end portion 10a, 10b arranged centrally within the first and second end region 8a, 8b, having a circular cross-section.

Additionally, the plurality of microchannel tubes 4 can advantageously be provided for insertion into a weaving apparatus at a length that extends beyond the central region 6, wherein the microchannel tubes 4 are preferably merged 300 at the regions extending beyond the central region 6 in order to produce a first and second end portion 10a, 10b having a circular cross-section, wherein a first and second frame 20 arranged on the end sides of the central region 6 can be used in particular in order to support a merging 300 of the microchannel tubes 4.

Additionally, the gluing 400 of the plurality of woven and merged microchannel tubes 4 within the first and second end region 8a, 8b as provided according to an embodiment of the invention can take place via an immersion process, wherein the woven and merged microchannel tubes 4 are preferably immersed on their end sides in a glue bath, in particular an epoxy glue bath.

The shortening 500 of the plurality of weaved, merged, and glued microchannel tubes 4 as provided here can further preferably be carried out via cutting, sawing, or milling.

Figure 2:
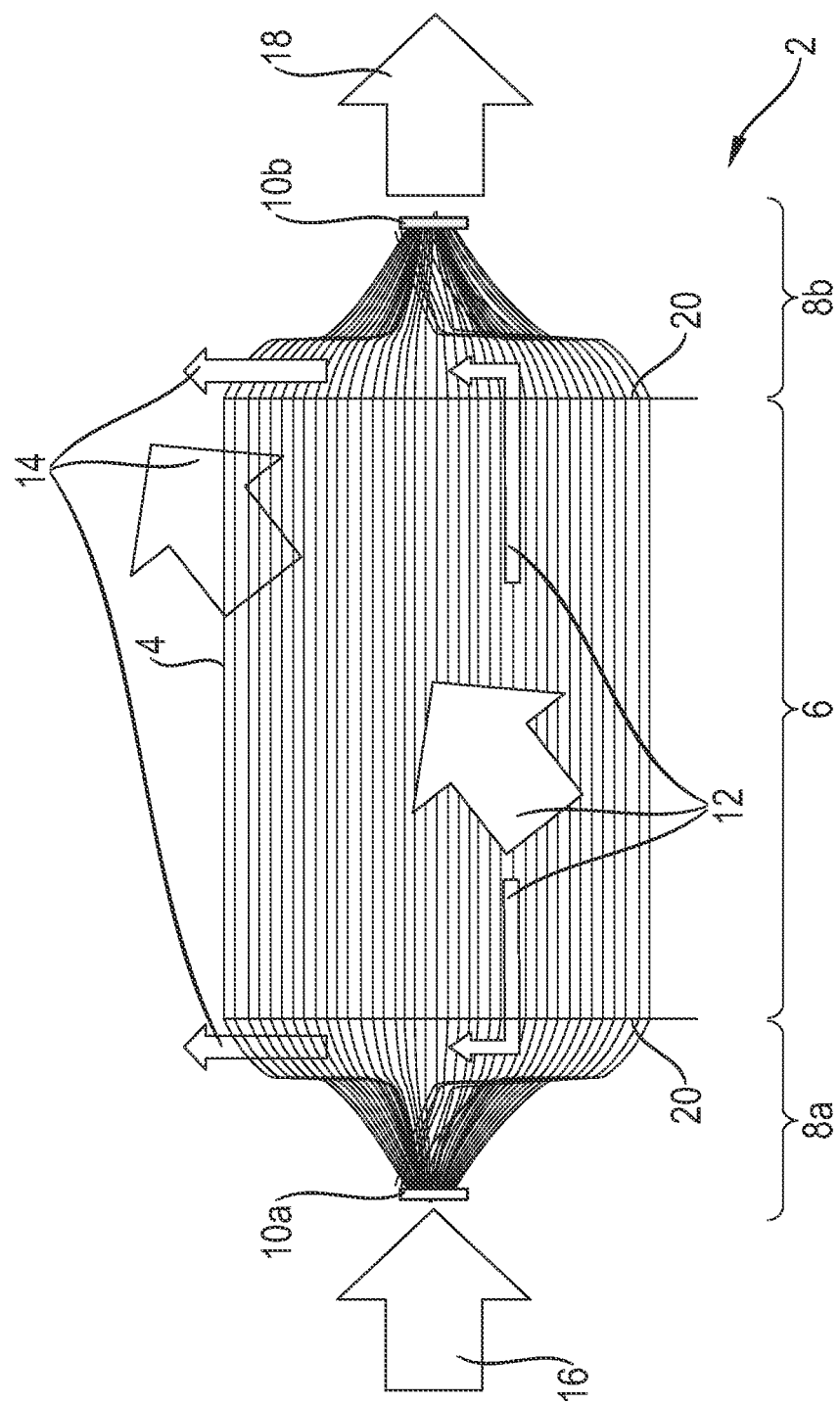
FIG. 2 illustrates a woven heat exchanger according to an embodiment of the invention in a side view.

FIG. 2 shows a heat exchanger 2 woven according to an embodiment of the invention according to a first exemplary embodiment in a side view.

As can be seen according to FIG. 2, the woven heat exchanger 2 according to an embodiment of the invention comprises a central region 6 in which the plurality of microchannel tubes 4 are given in a woven state and a first and second end region 8a, 8b arranged on the central region 6, in which the plurality of microchannel tubes 4 are merged and glued together in order to form a first and second end portion 10a, 10b having a circular cross-section. In the present case, between the central region 6 and the end regions 8a, 8b, frames 20 are also arranged in order to assist in a merging 300 of the microchannel tubes 4. Between the insertion of a cooling fluid into the microchannel tubes 4 at a cooling fluid inlet 16 at the first end portion 10a and a discharge of the cooling fluid from the microchannel tubes 4 at a cooling fluid outlet 18 at the second end portion 10b, the cooling fluid can be cooled off by the insertion of cold air at a cooling air inlet 12 and the discharge of the warmed air at the cooling air outlet 14. It is understood that, vice versa, warm air can also be cooled via the cooling fluid.

For weight reasons, the microchannel tubes 4 can advantageously consist of a plastic, preferably one of the following plastics: polyetheretherketone, polyetherketone polyimide, polyoxymethylene, polyethylene terephthalate.

The length of the central region 6 can be at least 3 times, preferably at least 5 times, in particular at least 10 times the length of the first and/or second end regions 8a, 8b.

The microchannel tubes 4 can further be aligned parallel to one another within the central region 6 and can be arranged at an angle to one another within the end regions 8a, 8b, preferably extending towards one another at an angle.

Figure 3:
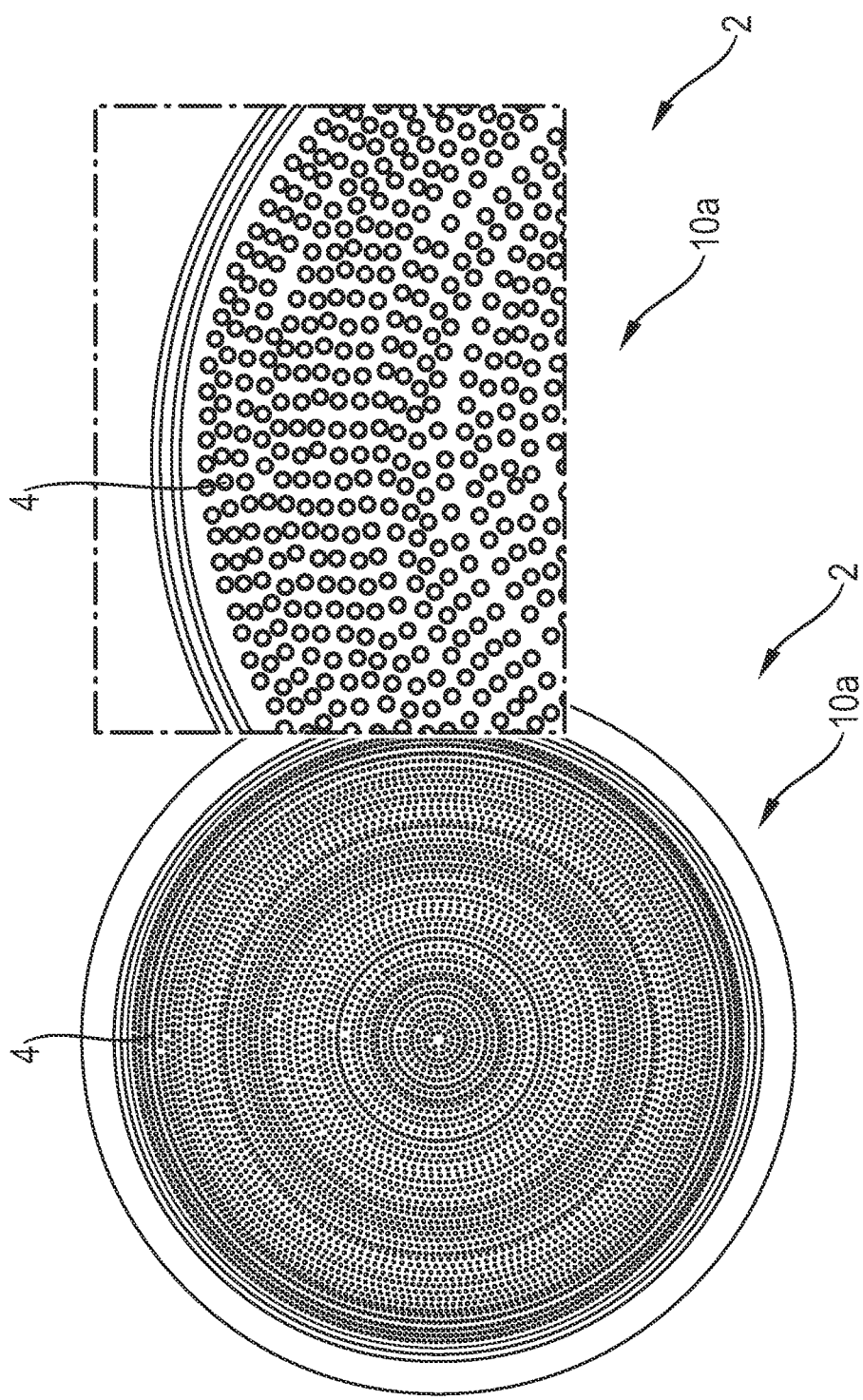
FIG. 3 illustrates a first end portion of a woven heat exchanger according to an embodiment of the invention according in a top plan view.

FIG. 3 shows a first end portion 10a of a heat exchanger 2 woven according to an embodiment of the invention according to a first exemplary embodiment in a top plan view as well as an enlarged region of the top plan view (right).

As can be seen according to FIG. 3, a plurality of microchannel tubes 4 are merged side-by-side within a first end portion 10a of the woven heat exchanger 2.

The above explanation of the embodiments describes embodiments of the present invention solely in the context of examples. Of course, individual features of the embodiments can be freely combined with one another, if technically meaningful, without leaving the scope of the present invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for producing a woven heat exchanger, comprising:
   providing a plurality of microchannel tubes for insertion into a weaving apparatus;
   weaving the plurality of microchannel tubes within a central region of the heat exchanger by the weaving apparatus;
   merging the plurality of woven microchannel tubes within a first and second end region arranged on the central region for producing a first and second end portion having a circular cross-section;
   gluing the plurality of woven and merged microchannel tubes within the first and second end region; and
   shortening the plurality of weaved, merged, and glued microchannel tubes within the first and second end region.

2. The method according to claim 1, wherein the weaving of the plurality of microchannel tubes within the central region of the heat exchanger is carried out by wires.

3. The method according to claim 1, wherein the merging of the plurality of woven microchannel tubes within the first and second end region takes place in the form of an interweaving of the microchannel tubes.

4. The method according to claim 1, wherein the plurality of microchannel tubes are provided for insertion into a weaving apparatus at a length that extends beyond the central region,
   and
   wherein a first and second frame arranged on end sides of the central region are used in order to support a merging of the microchannel tubes.

5. The method according to claim 1, wherein the gluing of the plurality of woven and merged microchannel tubes within the first and second end region takes place via an immersion process.

6. The method according to claim 1, wherein the shortening of the plurality of weaved, merged, and glued microchannel tubes takes place via a cutting, sawing, or milling operation.

7. A woven heat exchanger produced according to the method of claim 1, having a plurality of microchannel tubes for use in a motor vehicle, comprising:
   a central region in which the plurality of microchannel tubes are woven,
   a first and second end region arranged on the central region, in which the plurality of microchannel tubes are merged and glued into a first and second end portion having a circular cross-section.

8. The woven heat exchanger according to claim 7, wherein the microchannel tubes comprise a plastic.

9. The woven heat exchanger according to claim 7, wherein a length of the central region is at least three times a length of the first and/or second end region.

10. The woven heat exchanger according to claim 7, wherein the microchannel tubes are aligned parallel to one another within the central region and are arranged at an angle to one another within the end regions.

11. The motor vehicle comprising a woven heat exchanger according to claim 7.

12. The method according to claim 2, wherein, during the weaving, the plurality of microchannel tubes are entwined at least partially by the wires on two sides.

13. The method according to claim 3, wherein the plurality of woven microchannel tubes are interwoven into a first and second end portion arranged centrally within the first and second end region, having a circular cross-section.

14. The woven heat exchanger according to claim 8, wherein the microchannel tubes comprise one of the following plastics: polyetheretherketone, polyetherketone polyimide, polyoxymethylene, and polyethylene terephthalate.

15. The woven heat exchanger according to claim 9, wherein the length of the central region is at least five times the length of the first and/or second end region.

16. The woven heat exchanger according to claim 15, wherein the a length of the central region is at least ten times the length of the first and/or second end region.

17. The woven heat exchanger according to claim 10, wherein the microchannel tubes extend towards one another at the angle.

* * * * *